United States Patent
Anderson

[15] 3,683,455
[45] Aug. 15, 1972

[54] HIDE REMOVAL APPARATUS AND METHOD

[72] Inventor: James D. Anderson, P.O. Box 425, Richton Park, Ill. 60471

[22] Filed: Dec. 4, 1970

[21] Appl. No.: 95,359

Related U.S. Application Data

[62] Division of Ser. No. 710,198, March 4, 1968, Pat. No. 3,545,037.

[52] U.S. Cl. .................................................17/50
[51] Int. Cl. ..............................................A22b 5/16
[58] Field of Search.....................................17/21, 50

[56] References Cited

UNITED STATES PATENTS 3,229,328  1/1966  Schmidt, Jr.....................17/21
3,483,590  12/1969  Balasch et al...................17/21

FOREIGN PATENTS OR APPLICATIONS 251,963  5/1964  Australia.......................17/21
1,055,824  1/1967  Great Britain..................17/21

Primary Examiner—Lucie H. Laudenslager
Attorney—Carl C. Batz and Frank T. Barber

[57] ABSTRACT

An apparatus and method for removing the hide from suspended livestock carcasses. A portion of the hide which has been previously removed from the carcass is secured by clamping means, and a separating member is passed between the hide and the suspended carcass to separate further portions of the hide from the carcass.

2 Claims, 5 Drawing Figures

PATENTED AUG 15 1972 3,683,455

HIDE REMOVAL APPARATUS AND METHOD

This application is a division of the application by James D. Anderson, Ser. No. 710,198 entitled "HIDE REMOVAL APPARATUS AND METHOD," filed Mar. 4, 1968 issued on Dec. 8, 1970 as U.S. Pat. No. 3,545,037.

BACKGROUND OF THE INVENTION

This invention pertains to the removal of hides or pelts from various livestock carcasses such as steers, calves, sheep or lambs. One embodiment of this invention is particularly suited to the removal of pelts from sheep or lambs by use of a mechanical apparatus.

In recent years, the field of mechanical removal of livestock hides has been the subject of considerable development within the meat packing industry. Various apparatuses and methods have been developed to remove livestock hides on a large scale commercial basis.

Several problems have been somewhat common to all of the hide removing methods developed thus far. In the most common method, the carcass is secured in some manner, the hide is attached to some type of pulling means, and the hide is then pulled away from the carcass. In these methods the hide generally moves further and further away from the carcass either in a vertical or horizontal direction during the pulling stage, thereby necessitating a large working area in order to accomplish the pulling step. These methods therefore are not particularly well suited to packing plants which have limited vertical or horizontal space available.

Secondly, the mechanical hide pulling methods known in the art have generally proved to be unsuccessful in removing the hides from sheep or lambs, and are generarlly limited to use with beef cattle and the like. The inapplicability of known mechanical pulling means to sheep and lambs is caused by the fact that sheep and lambs have a thin membrane between the hide and the meat which is commonly referred to as the fell, and it is commercially of great importance that the hide be removed without in any way damaging the fell. In order for the sheep or lamb carcass to be of the highest commercial value, the fell must be left intact on the carcass. Known mechanical hide removing apparatuses have been unsuccesful in accomplishing the removal of the hide from sheep and lambs, while at the same time leaving the fell intact on the carcass. For this reason the removal of hides from sheep and lambs is performed almost exclusively by hand.

It is an object of the present invention therefore, to provide a new and improved method and apparatus for removing the hides from livestock carcasses wherein said apparatus can operate in areas having relatively small amounts of available space.

It is a further object of the invention to provide a mechanical hide removing apparatus and method which is equally adaptable to removing the hides from lambs and sheep as well as beef cattle and calves.

It is a further object of the invention to provide a mechanical hide removal apparatus and method which will eliminate the requirement for large amounts of hand skinning, and will mechanically remove the major portion of livestock hides in one single operation.

Further objects and advantages of the present invention will be specifically pointed out as the specification proceeds.

The present invention is an apparatus and method for removing the hides from livestock carcasses which have been suspended from overhead means, have the hide cut lengthwise of the carcass, and have a small portion of the hide previously cleared away. The apparatus provides a blunted separating member which is passed lengthwise of the carcass between the carcass and the portion of the hide which has been previously cleared therefrom in order to remove the remaining portions of the hide from the carcass, while at the same time securing that portion of the hide which had been previously removed against the forces exerted by the hide separating member. In this manner both the carcass and the hide can remain essentially stationary relative to each other while the only movement necessary is the movement of the hide separating member within the space between the carcass and the hide. If preferred, and particulary when removing the hides from sheep and lambs, an additional member is added to pass between the hide and the carcass with the hide separating member to apply pressure to the carcass at approximately the point of separation between the carcass and the hide, in order to prevent any tearing of the fell from the carcass.

In the preferred operation of this apparatus and method, the carcass is suspended by the hind legs depending from an overhead support means. The hide is cut lengthwise along the underside of the carcass, and the hide is cleared from the hind shanks and legs. The portion of the hide thus removed from the hind shanks and legs is secured by a clamping means against downward movement, and a hide separating member is driven downwardly between the hide and the backside of the carcass thereby separating further portions of the hide from the carcass.

The apparatus will be more specifically described by reference to the drawings in which.

Figure 1:
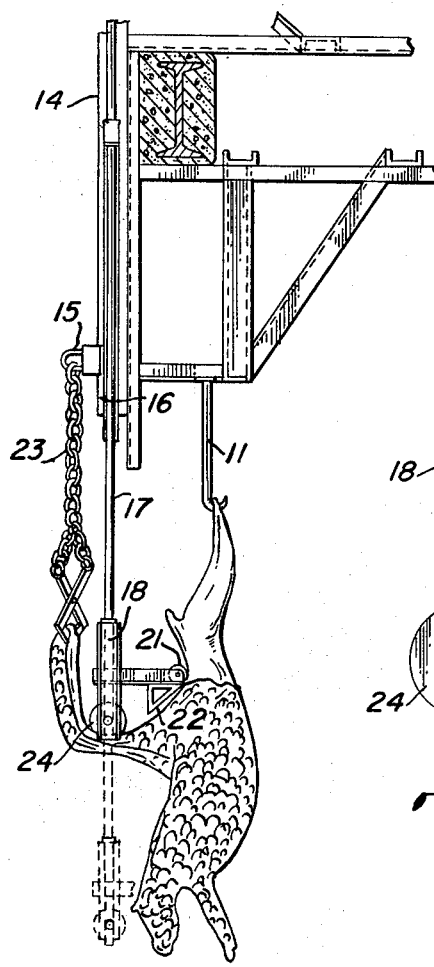
FIG. 1 is a side elevational view of the apparatus in the process of removing the hide from a suspended livestock carcass.

In FIG. 1, 11 designates a hook or other means commonly used to suspend livestock carcasses from overhead rails in slaughter and packing operations. Hook 11 may be attached to a continuous moving conveyor chain system (not shown) of the type widely employed in packing plant operations to transport livestock carcasses from station to station where various butchering steps are carried out. A support structure 14 is provided in order to mount and support the various operable components of my apparatus. The support structure may be fixed or it may be mounted on rollers allowing it to be moved horizontally in the same direction of movement as the conveyor chain, and in the reverse direction of the conveyor chain.

Mounted on support structure 14 is a retaining lug 15 to which is attached a chain 23 and in turn a clamp 13. It will be understood that the clamp 13 shown in the drawing is for descriptive purposes only and any suitable clamping means can be substituted therefor.

Mounted in support structure 14 is a cylinder 16 which contains a moveable piston 17. At one end of piston 17 is attached frame 18 which houses roller 24. Cylinder 16 may be of the compressed air type, the hydraulic fluid type, or a combination air-hydraulic fluid type. The combination air-oil type cylinder is preferably used to drive piston 17, thereby moving frame 18 and roller 24 upwardly and downwardly in an approximately vertical plane. As these types of powered piston-cylinder arrangements are well known in the mechanical arts, the means for driving piston 17 is not shown in the drawings.

Figure 2:
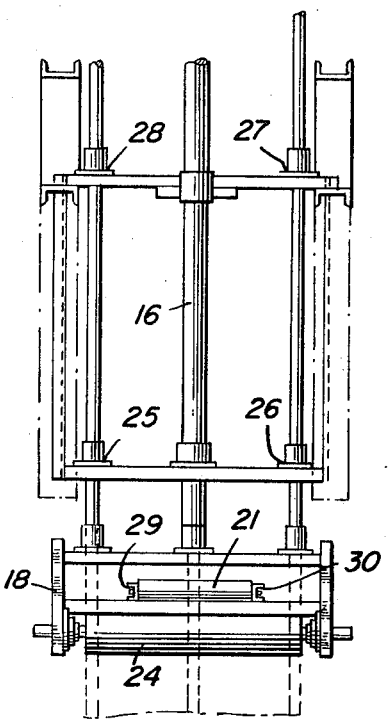
FIG. 2 is a partial front view of the apparatus.

In order to prevent rotation of frame 18 about the long axis of piston 17, guide rods 19 and 20 are provided, shown best in FIG. 2, which are fixed to frame 18 and slideably mounted in support structure 14 through apertures 25, 26, 27 and 28.

Figure 3:
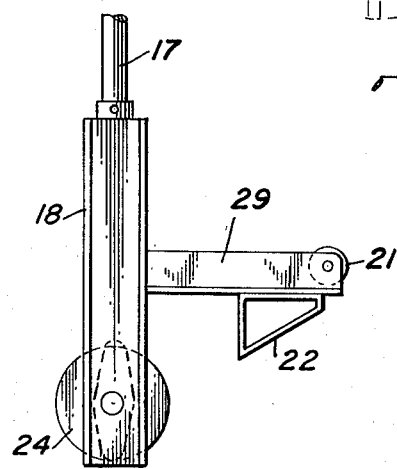
FIG. 3 is an enlarged side view of the hide separating component shown in FIG. 1.

In one embodiment of the apparatus shown in enlarged view in FIG. 3, mounting brackets 29 and 30 are fixed to frame 18 and vertically disposed from roller 24. Rotably mounted in brackets 29 and 30 is roller 21. Also mounted on brackets 29 and 30 below roller 21 is an angled tail folding plate 22, shown best in FIGS. 4 and 5.

While in FIG. 1 clamp 13 has been shown attached by chain 23 to retaining lug 15, it will be understood that retaining lug 15 need not be stationary but may be moveable in a plane parallel to the plane of movement of piston 17, thereby moving clamp 13 in the same plane.

It will be further understood that while rollers 21 and 24 have been illustrated, these parts need not be rollers and any suitably blunted or rounded device may be substituted without altering the structural concept or operation of the apparatus.

When operating the embodiment of the apparatus having mounting brackets 29 and 30 and roller 21, it has been determined that favorable results are obtained when the roller 21 is positioned so that the horizontal distance it extends away from roller 24 is about 1.0 to 1.5 times the vertical distance it extends away from roller 24. It has also determined that optimum results are obtained with this embodiment when said horizontal distance is about 1.3 times said vertical distance.

OPERATION

In the operation of the apparatus and method a livestock carcass is suspended from hook 11. The carcass has been prepared by cutting the hide lengthwise along the side facing away from the hide removing apparatus, and a portion of the hide has been removed from the shanks and legs attached to hook 11.

In the preferred method of operation the carcass is suspended by the hind legs with the back of the carcass facing the hide removal apparatus. The carcass is cut lengthwise along the underside, and the hide has previously been removed from the rear shanks and legs.

The portion of the hide previously removed is attached to clamp 13. At this stage piston 17 is in its fully retracted position. Cylinder 16 is then actuated, driving piston 17, frame 18 and roller 24 downwardly between the carcass and the hide. Roller 24 engages and rides on the hide, thereby separating further portions of the hide from the carcass as piston 17 is extended. If desired, piston 17 may be extended until all of the hide has been removed from the carcass, or it may be stopped at any intermediate point and the remainder of the hide removed by hand skinning. After removal of the hide, it is released from clamp 13 and cylinder 16 is actuated to retract piston 17 into position to receive the next carcass.

When using the apparatus to remove the hides from sheep or lambs, it is preferred to use the embodiment shown in enlarged view in FIG. 3. In the operation of this embodiment, roller 21 rides on the carcass near the point of separation between the carcass and the hide as piston 17 is extended. By applying pressure to the carcass through roller 21 the fell remains intact on the carcass as the hide is removed.

Figure 4:
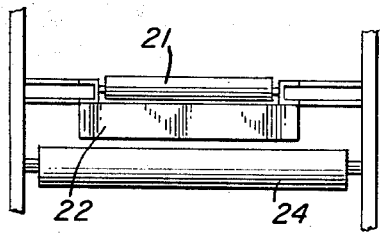
FIG. 4 is an enlarged front view of the hide separating component shown in FIG. 1.
Figure 5:
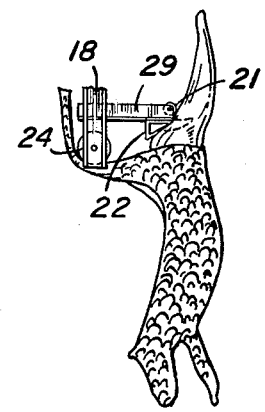
FIG. 5 is a side view depicting the tail folding member engaging the tail of a carcass.

When using the last described embodiment with sheep or lambs which have been suspended by the hind legs with the backside of the carcass facing the hide removal apparatus, it has been found that if roller 21 initially engages the carcass at a point above the tail it will contact the underside of the tail as it moves downwardly along the carcass. When this occurs, roller 21 will bend the tail down along the backside of the carcass which causes the fell to tear in the tail area. In order to prevent this highly undesirable tearing and separating of the fell from the carcass tail folding plate 22 has been provided. As shown in FIGS. 4 and 5, tail folding plate 22 is fixed to brackets 29 and 30 in slanted disposition between roller 21 and roller 24. As piston 17 is extended downwardly, the tail of the carcass is initially contacted by tail folding plate 22. Because of the slanted disposition of tail folding plate 22, it exerts a camming action on the tail causing the tail to be folded between the hind legs of the carcass, as illustrated in FIG. 5. Roller 21 then passes over the tail area without engaging the underside of the tail and the fell is thereby kept intact in the tail area.

If desired, and especially when vertical operating space is at a minimum, retaining lug 15 may be moveable in a plane parallel to the plane of movement of piston 17, thereby moving clamp 13 in a like plane. In the operation of this embodiment retaining lug 15 is driven upwardly by a piston or other means (not shown) as piston 17 is extended downwardly, thereby removing the hide through a combination of the separating force exerted by roller 24 and the pulling force of retaining lug 15 and clamp 13. This embodiment is particularly useful when the apparatus is installed in a processing plant having an existing overhead rail conveyor, wherein the distance between the lowermost portion of the suspended carcass and the floor is not sufficient to allow piston 17 to extend far enough to remove the hide from the lowermost portion of the carcass. When this occurs, piston 17 may be extended as far as space will permit and held essentially stationary while the remaining portions of the hide are removed by the pulling force created by the upward movement of retaining lug 15 and clamp 13.

It will be understood that while the apparatus has been illustrated operating downwardly along a carcass which has been suspended by its hind legs, the invention is not limited thereto. The carcass, if desired, could be suspended by its front legs, or the hide could be initially cleared from the lowermost portions of the carcass and the apparatus mounted in such way as to be driven upwardly between the carcass and the hide.

While in the foregoing specification specific embodiments of the apparatus and method have been set out, it will be understood that other additional modifications can be made by those skilled in the art without departing from either the spirit or the scope of the invention.

I claim:

1. The method of removing the hide from livestock carcasses having the hide cut lengthwise and having a portion of the hide removed therefrom comprising the steps of:
   a. suspending the carcass in a vertical position;
   b. securing the portion of the hide previously removed against downward movement;
   c. forceably passing a laterally disposed cylinder downwardly between the carcass and the hide.

2. The method of removing the hide from livestock carcasses having the hide cut lengthwise and having a portion of the hide removed therefrom comprising the steps of: suspending the carcass in a vertical position; securing the portion of the hide previously removed against downward movement; forceably passing a pair of laterally disposed rollers downwardly between the hide and the carcass, said rollers being vertically and horizontally disposed from each other in such a manner that the lowermost roller rides on the hide and the uppermost roller rides on the carcass to progressively separate further portions of hide from said carcass while maintaining pressure against said carcass near the point of separation.

* * * * *